(12) United States Patent
Nordström

(10) Patent No.: US 7,841,367 B2
(45) Date of Patent: Nov. 30, 2010

(54) TUBE OF FABRIC REINFORCED PVC

(76) Inventor: Lars-Ingvar Nordström, Pedellgaton 30, 224 60 Lund (SE)

( * ) Notice: Subject to any disclaimer, the term of this patent is extended or adjusted under 35 U.S.C. 154(b) by 0 days.

(21) Appl. No.: 12/465,121

(22) Filed: May 13, 2009

(65) Prior Publication Data

US 2009/0288727 A1    Nov. 26, 2009

(30) Foreign Application Priority Data

May 22, 2008   (SE) .................................. 0801183

(51) Int. Cl.
    *F16L 11/00*    (2006.01)
(52) U.S. Cl. ................... 138/107; 138/125; 138/141
(58) Field of Classification Search ............... 138/107, 138/125, 141
    See application file for complete search history.

(56) References Cited

U.S. PATENT DOCUMENTS

| | | | | |
|---|---|---|---|---|
| 1,244,465 A | * | 10/1917 | Braly ........................... | 248/61 |
| 2,215,283 A | * | 9/1940 | Adler ...................... | 174/40 CC |
| 2,804,095 A | * | 8/1957 | Schauenburg ............... | 138/107 |
| 3,357,088 A | * | 12/1967 | Hoffman et al. .............. | 29/432 |
| 3,520,244 A | * | 7/1970 | Gaines, Jr. ................... | 454/277 |
| 4,394,705 A | * | 7/1983 | Blachman ................... | 361/215 |
| 4,447,378 A | * | 5/1984 | Gray et al. ................. | 264/45.9 |
| 4,944,973 A | * | 7/1990 | Follette ...................... | 428/36.1 |
| 5,022,459 A | * | 6/1991 | Chiles et al. ................ | 165/11.1 |
| 5,137,057 A | * | 8/1992 | Hummert, III ............... | 138/107 |
| 5,236,164 A | * | 8/1993 | Iorizzo ........................ | 248/343 |
| 5,285,818 A | * | 2/1994 | Hummert, III ............... | 138/107 |
| 5,429,330 A | * | 7/1995 | Bond et al. .................... | 248/61 |
| 5,678,609 A | * | 10/1997 | Washburn .................... | 138/107 |
| 6,202,701 B1 | * | 3/2001 | Gobl ........................... | 138/127 |
| 6,293,312 B1 | * | 9/2001 | Stripe ......................... | 138/141 |
| 6,315,004 B1 | * | 11/2001 | Wellman et al. ............. | 138/146 |
| 6,508,276 B2 | * | 1/2003 | Radlinger et al. ........... | 138/125 |
| 6,843,274 B1 | * | 1/2005 | Angelico ...................... | 138/39 |
| 7,040,351 B2 | * | 5/2006 | Buck et al. ................... | 138/127 |
| 2007/0144756 A1 | * | 6/2007 | Wenger et al. ................ | 174/47 |

FOREIGN PATENT DOCUMENTS

| | | |
|---|---|---|
| DE | 24 08 517 A1 | 8/1975 |
| DE | 85 16 329 U1 | 7/1985 |
| FR | 2 370 188 | 6/1978 |

OTHER PUBLICATIONS

European Search Report for European Application No. EP 09 16 0158 mailed Apr. 20, 2010.

* cited by examiner

*Primary Examiner*—James F Hook
(74) *Attorney, Agent, or Firm*—Merchant & Gould P.C.

(57) ABSTRACT

A tube (1) of fabric reinforced PVC for suspension from a ceiling of a tunnel or the like comprises a tube shaped fabric with an internal and an external coating of PVC. The internal coating is of black, electrically conducting PVC and the external coating is of white, electrically isolating PVC. The tube (1) is provided with an external, longitudinal strip (2) of black, electrically conducting PVC in contact with the internal coating. The strip (2) is earthed by a suspension arrangement (3-5) for the tube (1) to the ceiling.

5 Claims, 1 Drawing Sheet

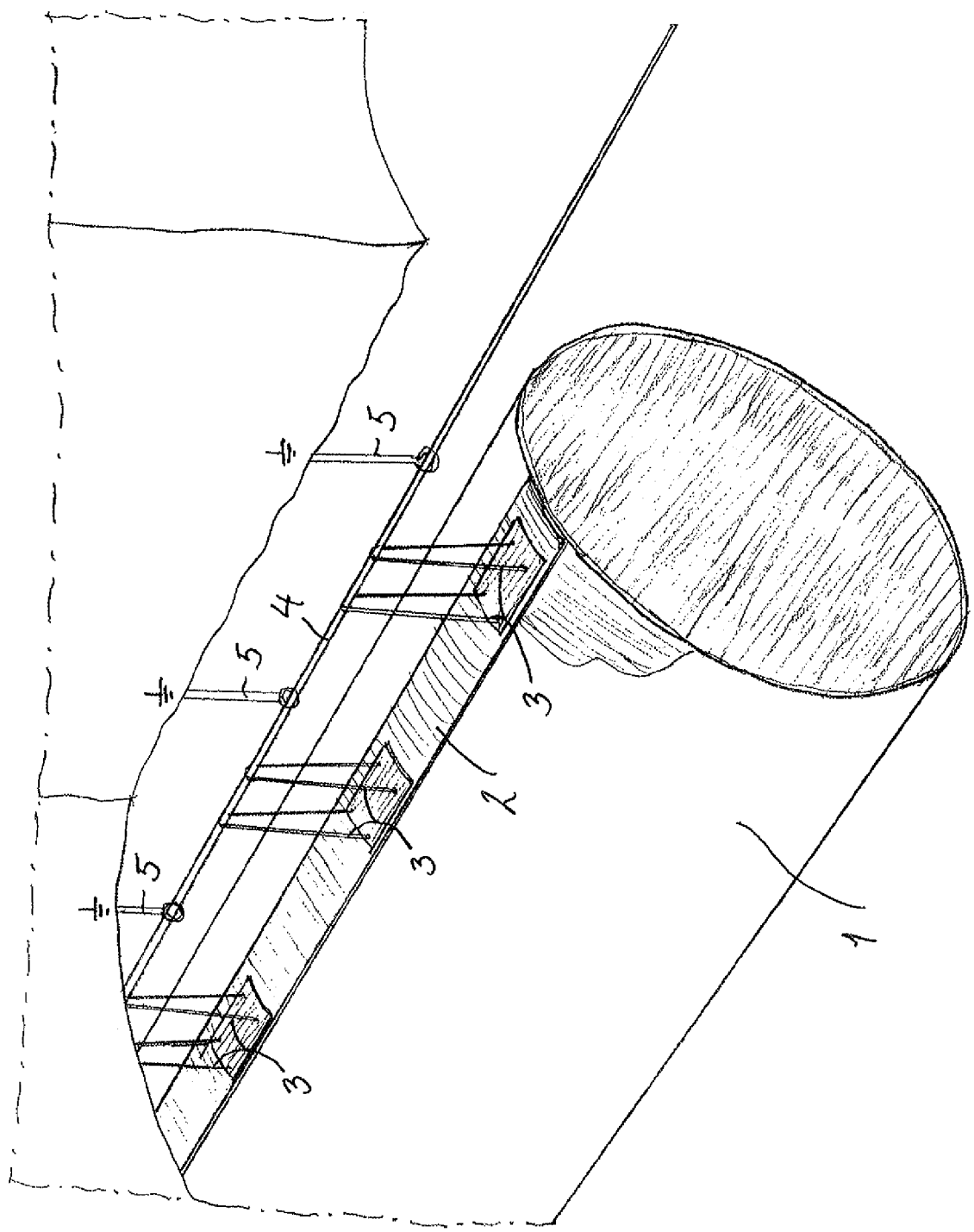

TUBE OF FABRIC REINFORCED PVC

This application claims benefit to Serial No. 0801183-5, filed 22 May 2008 in Sweden and which application is incorporated herein by reference. To the extend appropriate, a claim of priority is made to each of the above-disclosed applications.

TECHNICAL FIELD

The present invention relates to a tube of fabric reinforced PVC for suspension from a ceiling of a tunnel or the like, comprising a tube shaped fabric with an internal and an external coating of PVC.

BACKGROUND OF THE INVENTION

Tubes of fabric reinforced PVC may be used in underground environments for transporting for example fresh air. Examples of underground environments are mine galleries or shafts and transport tunnels. It is well known that static electricity can be created by air flowing in such a tube. It is of great importance to obviate spark formation in the described environment, and thus the static electricity has to be removed in a secure way for obviating accidents in the environment, that can be extremely explosive.

Previous attempts have not proven entirely successful.

THE INVENTION

A solution to the problem of obviating dangerous sparks in the underground environment is according to the invention obtained in that the internal coating is of black, electrically conducting PVC and the external coating is of white, electrically isolating PVC and that the tube is provided with an external, longitudinal strip of black, electrically conducting PVC in contact with the internal coating, the strip being earthed by an electrically conducting suspension arrangement for the tube to the ceiling.

BRIEF DESCRIPTION OF THE DRAWING

The invention will be described in further detail below under reference to the accompanying drawing, in which the single FIGURE is a perspective view of a tunnel with a tube according to the invention.

DETAILED DESCRIPTION

A tube 1 shown in the drawing is intended for transport of for example fresh air in a tunnel or the like. The tube may have a diameter of say 300-3000 mm. The tube 1 may be built-up with a fabric as a base and with an internal coating of black PVC with an area weight of some 150-200 g/m$^2$. As is known in the art, black PVC is electrically conducting.

Except as described below, the tube 1 is externally provided with a coating of white PVC, preferably with an area weight of for example 300 g/m$^2$, which is higher than for the internal coating. As is known in the art, white PVC is electrically isolating, which means that static electricity created inside the tube 1 by the air flowing therein will not be able to be transmitted to the ambient air in the tunnel through the external coating of white PVC.

In order to securely conduct away the static electricity from the inside of the tube 1, the tube is externally provided with a longitudinal strip 2 of electrically conducting black PVC in contact with the internal coating of black PVC.

At intervals of for example 0.75-1 m the strip 2 is provided with anchoring wires 3 for suspending the tube 1 from a suspension line 4. (Two such wires in each set are shown for the purpose of guaranteeing the safety, should one wire break.) The suspension line 4 may be attached to the tunnel ceiling by means of suspension rods 5 at regular intervals. The suspension arrangement consisting of the anchoring wires 3, the suspension line 4, and the suspension rod 5 is electrically conducting, so that static electricity from the inside of the tube 1 is securely earthed in the tunnel ceiling.

Modifications are possible within the scope of the appended claims, especially with regard to the suspension arrangement.

The invention claimed is:

1. A tube of fabric reinforced PVC for suspension from a ceiling of a tunnel, comprising a fabric that forms a continuous tube having an interior surface, the tube having an internal and an external coating of PVC, wherein the internal coating continuously covers the interior surface of the fabric tube and is of black, electrically conducting PVC and the external coating is of white, electrically isolating PVC and that the tube is provided with an external, longitudinal strip of black, electrically conducting PVC in contact with the internal coating, the strip being earthed to the tunnel ceiling by an electrically conducting suspension arrangement.

2. A tube according to claim 1, wherein the strip is provided with anchoring wires at intervals for suspension from a suspension line to be attached to the tunnel ceiling by means of suspension rods.

3. A tube according to claim 1, wherein the tube has a diameter of 300-3000 mm.

4. A tube according to claim 1, wherein the internal coating has an area weight of some 150-200 g/m$^2$.

5. A tube according to claim 1, wherein the external coating has an area weight of some 300 g/m$^2$.

* * * * *